(12) United States Patent
Chang

(10) Patent No.: US 6,264,226 B1
(45) Date of Patent: Jul. 24, 2001

(54) PEDAL CRANK STRUCTURE OF CHILDREN'S BIKE

(76) Inventor: Chu-Chan Chang, 22 Lane 226, Tai Ping Rd., Tai Pin Village, Pu Hsin Hsiang, Chan Hua Hsien (TW)

( * ) Notice: Subject to any disclaimer, the term of this patent is extended or adjusted under 35 U.S.C. 154(b) by 0 days.

(21) Appl. No.: 09/499,125

(22) Filed: Feb. 7, 2000

(51) Int. Cl.$^7$ ........................................................ F16C 9/02
(52) U.S. Cl. ............................................. 280/259; 384/431
(58) Field of Search .................................. 280/259, 260, 280/261; 74/594.1, 594.2; 384/431, 545, 589, 903

(56) References Cited

U.S. PATENT DOCUMENTS

| | | | | |
|---|---|---|---|---|
| 4,358,967 | * | 11/1982 | Kastan | 74/594.2 |
| 5,437,510 | * | 8/1995 | Jeng | 384/538 |
| 6,003,889 | * | 12/1999 | Shalom | 280/259 |
| 6,058,804 | * | 5/2000 | Chang | 74/594.1 |

* cited by examiner

Primary Examiner—Kevin Hurley
(74) Attorney, Agent, or Firm—Harrison & Egbert

(57) ABSTRACT

An axle pivoting structure of a children's bicycle includes a shaft tube which is provided at both ends thereof with a position confining recess. The axle is provided at both ends thereof with a crank arm having a shaft support hole. The axle is fastened pivotally to the shaft tube by a first shaft support member and a second shaft support member. The first shaft support member is formed of two semicircular members, with each having an annular lip and an insertion protrusion corresponding in location to the position confining recess. The second shaft support member is formed of a circular tubular member having an annular lip and a tapered cell, in conjunction with two semicircular plug members, with each having an annular protruded edge which is received in the tapered cell. The circular tubular member is provided with an insertion protrusion corresponding in location to the position confining recess. The shaft tube is provided with an annular stop edge which is provided with a C-shaped retainer for pressing against the semicircular plug member.

3 Claims, 7 Drawing Sheets

PEDAL CRANK STRUCTURE OF CHILDREN'S BIKE

FIELD OF THE INVENTION

The present invention relates generally to a children's bicycle, and more particularly to a wheel axle pivoting structure of the children's bicycle.

BACKGROUND OF THE INVENTION

As shown in FIGS. 1–4, a children's bicycle 10 of the prior art has a chain ring shaft tube 11 which is provided at both ends thereof with a position confining recess 12. The bicycle 10 also has an axle 13 which is provided at both ends thereof with a crank arm 15 having a shaft support hole 14. A chain ring 16 is mounted on the axle 13, which is fastened pivotally to the shaft tube 11 by two shaft support members 17 and 18, which comprise an annular tube member 20 having an annular lip 21, an insertion protrusion 22, an annular cell 23, a stepped annular edge 24, and a semiannular plate member 26 having a stop edge 25. The shaft support member 18 is further provided with a fine annular plate 27, a wide annular plate 28, and an elastic annular member 29. A tubular bolt member 30 is received in a support hole 31 of the axle 13. The prior art axle pivoting structure is too complicated and can not be easily assembled.

SUMMARY OF THE INVENTION

The primary objective of the present invention is to provide a children's bicycle with an axle pivoting structure comprising a first shaft support member, a second shaft support member, and an annular tubular member. The first shaft support member is formed of two semiannular members, with each having an annular lip. The second shaft support member is formed of two semi-tapered members, with each having an annular protruded edge. The annular tubular member has an annular lip and a tapered cell. The axle pivoting structure is relatively simple in construction.

The objective, features and functions of the present invention will be more readily understood upon a thoughtful deliberation of the following detailed description of the present invention with reference to the accompanying drawings.

DETAILED DESCRIPTION OF THE INVENTION

Figure 1:
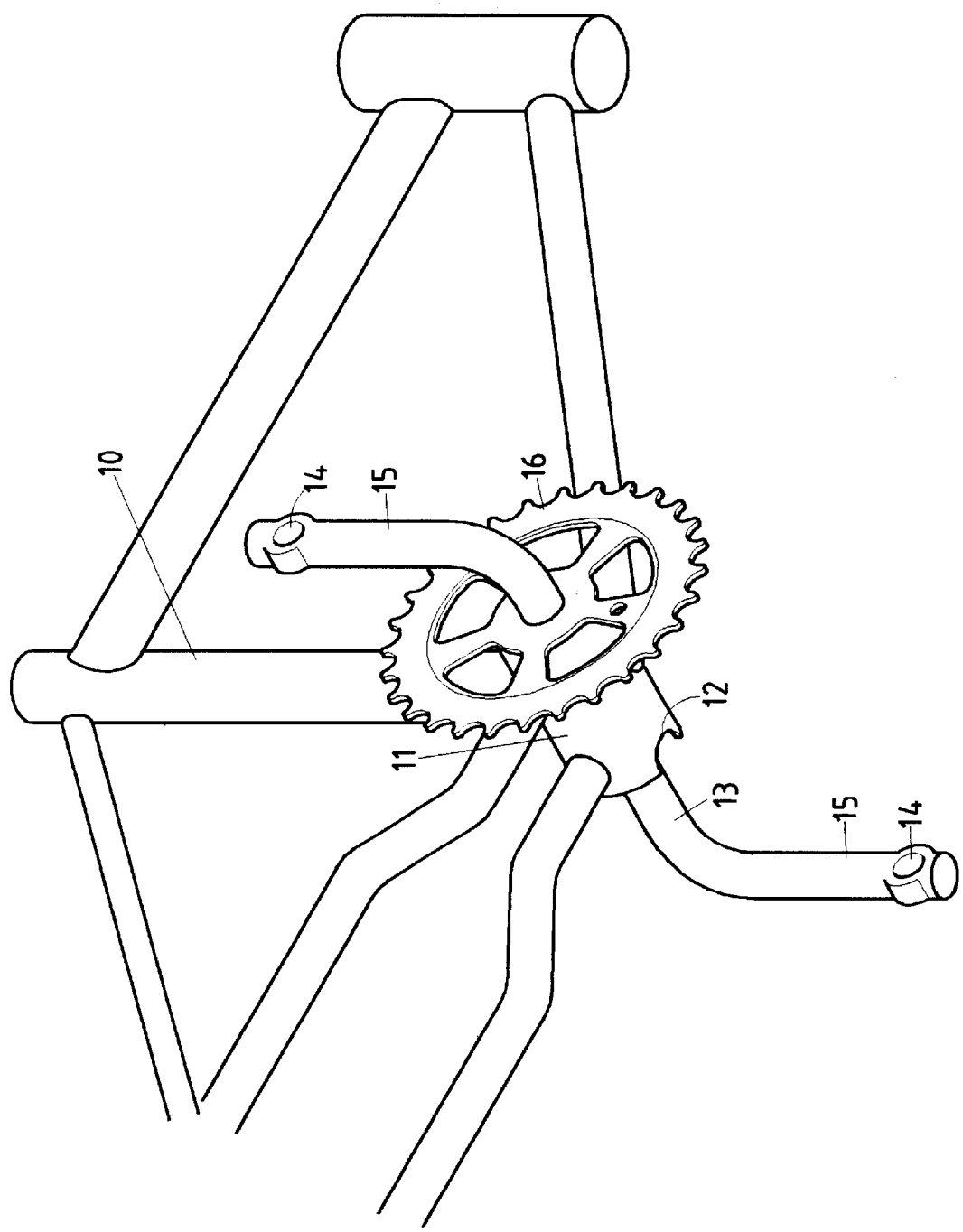
FIG. 1 shows a perspective view of an axle of a children's bicycle of the prior art.
Figure 2:
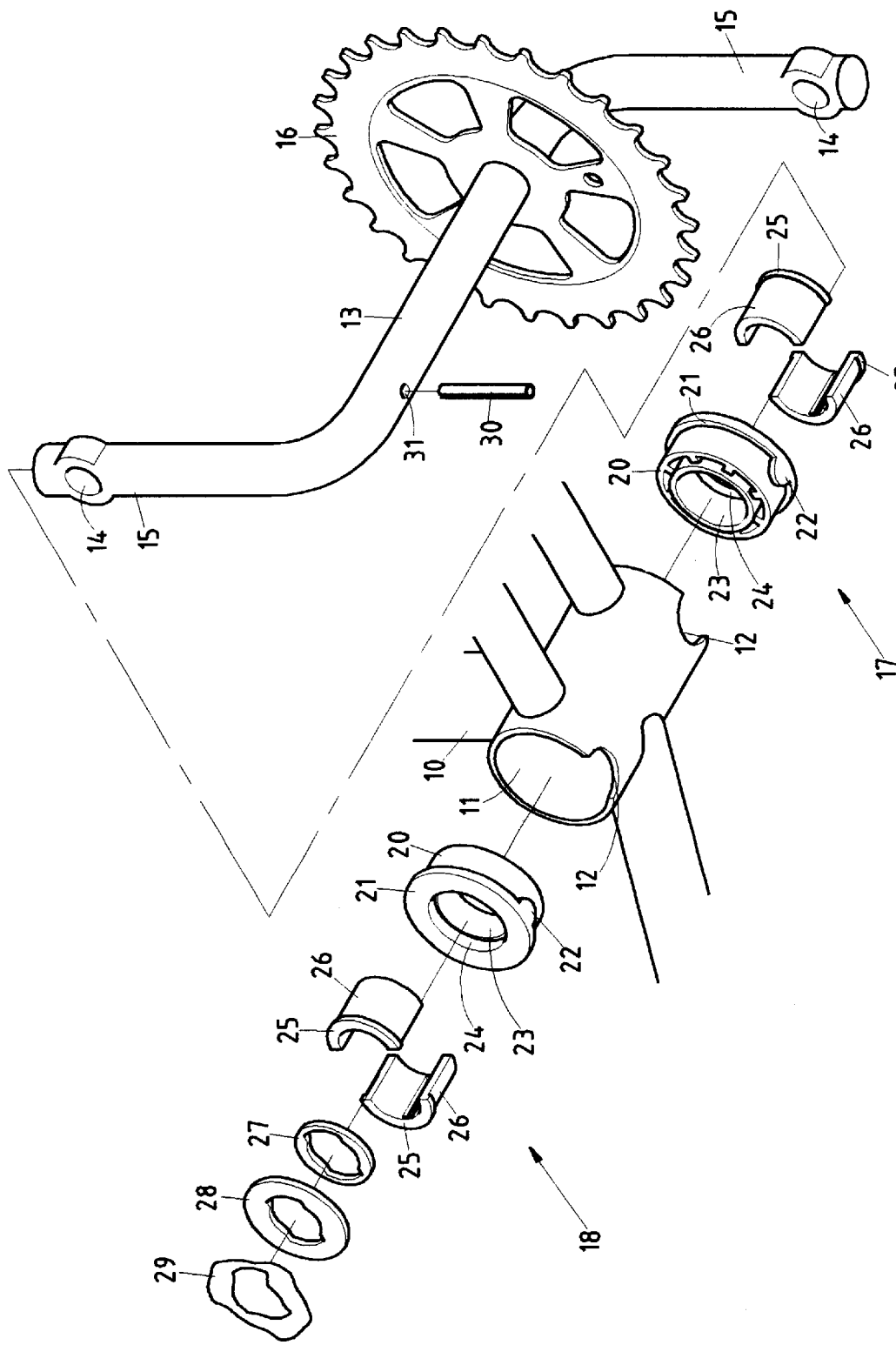
FIG. 2 shows an exploded view of the axle of the children's bicycle of the prior art.
Figure 3:
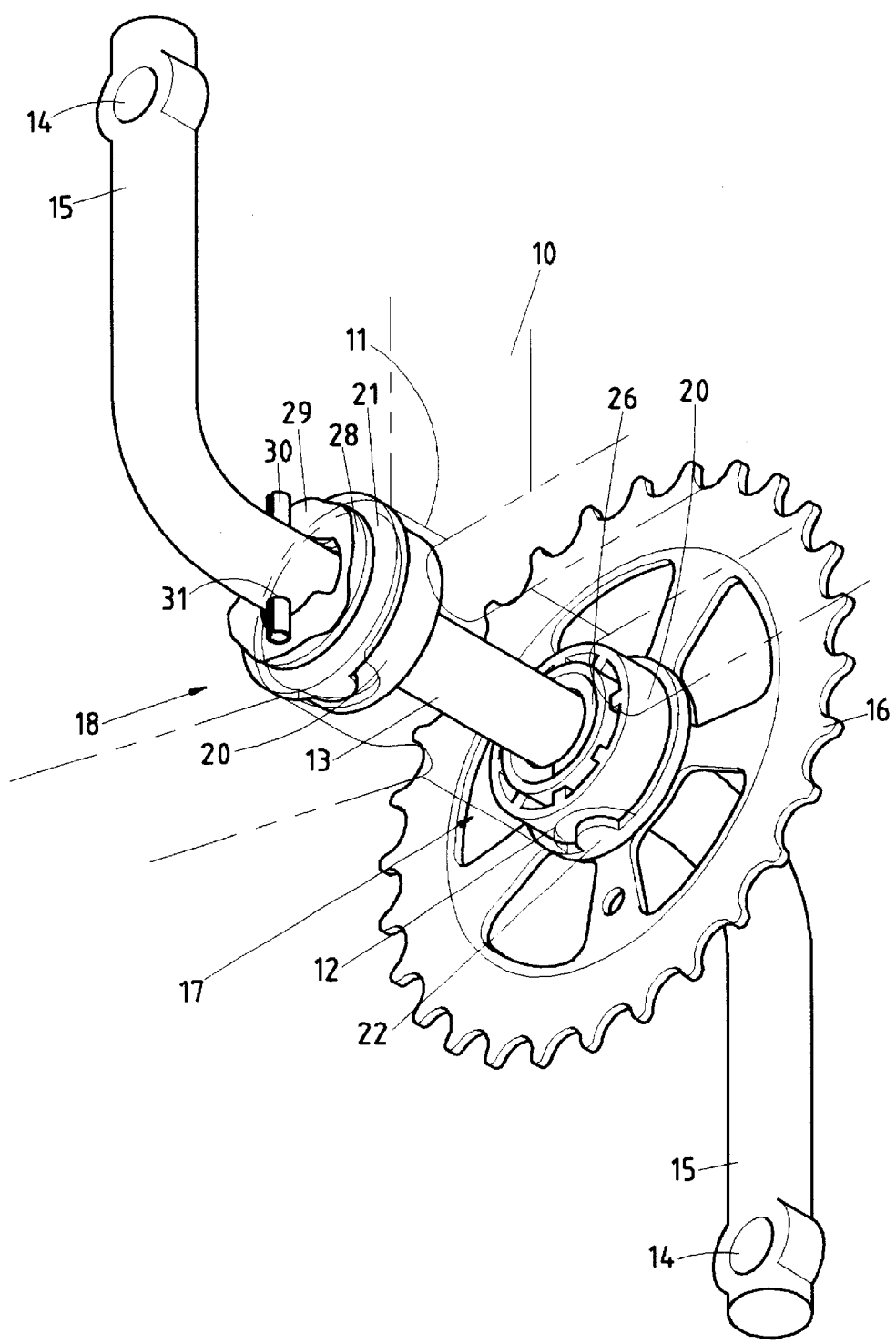
FIG. 3 shows a perspective view of the axle of the children's bicycle of the prior art.
Figure 4:
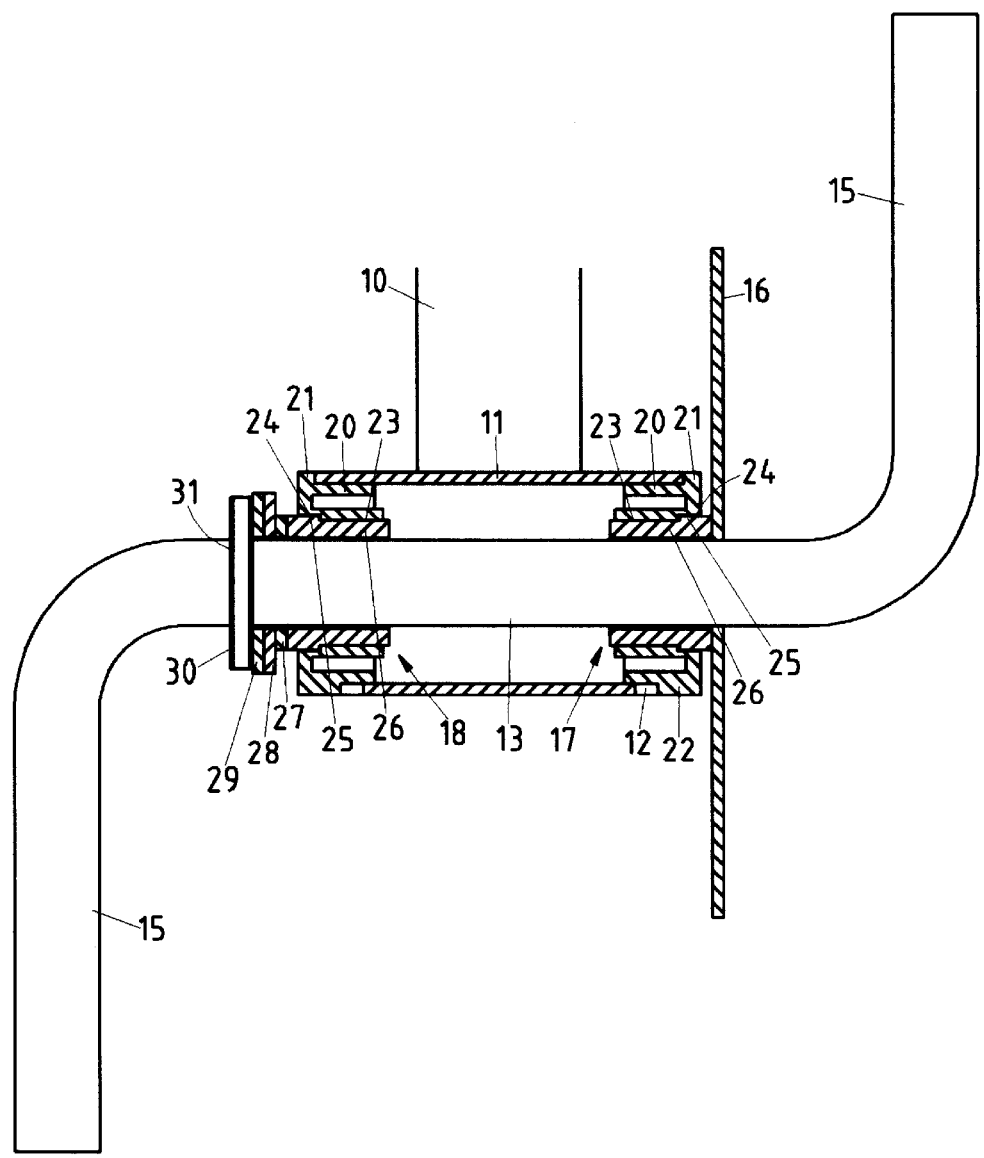
FIG. 4 shows a sectional view of the axle of the children's bicycle of the prior art.
Figure 5:
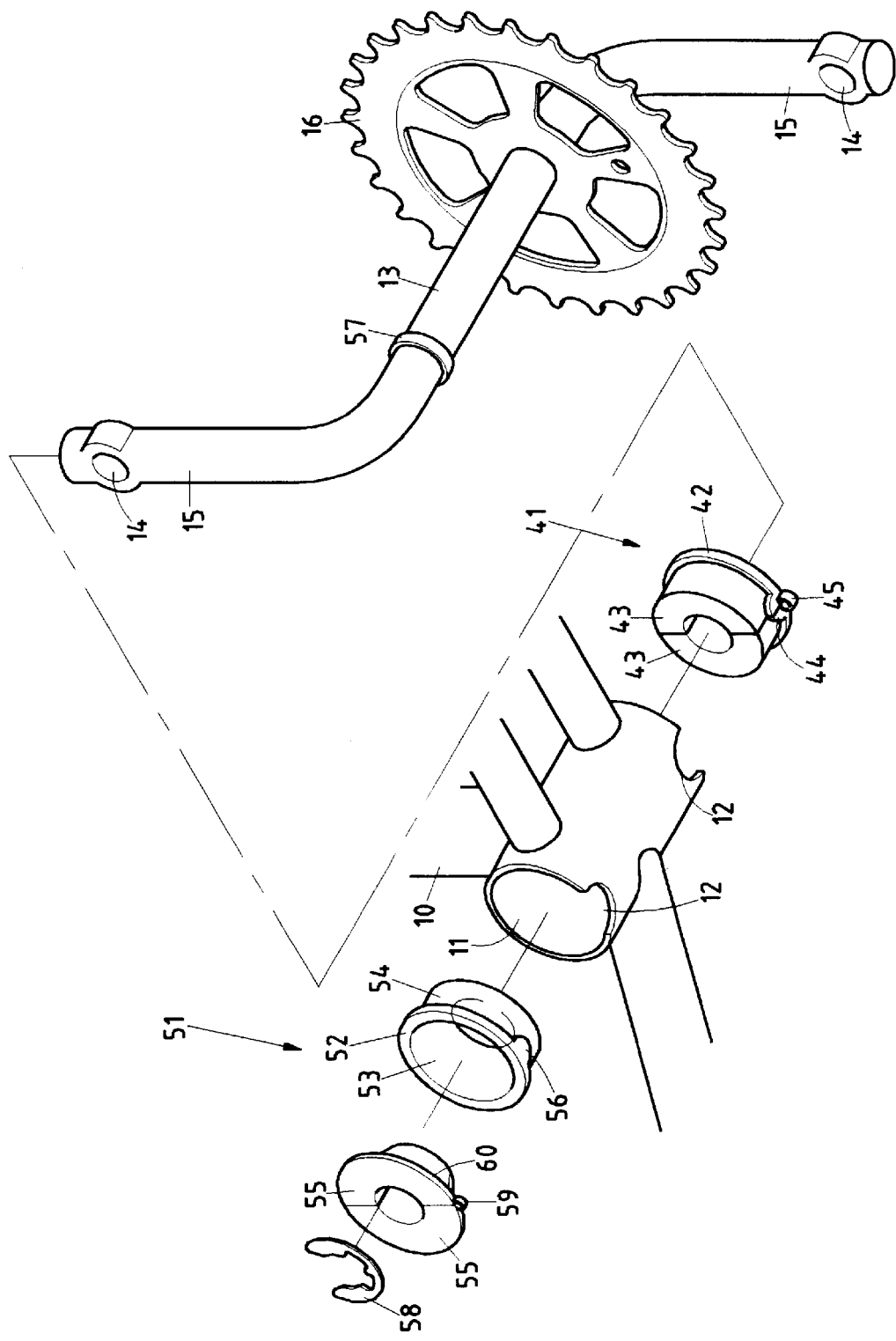
FIG. 5 shows an exploded view of an axle of a children's bicycle of the present invention.
Figure 6:
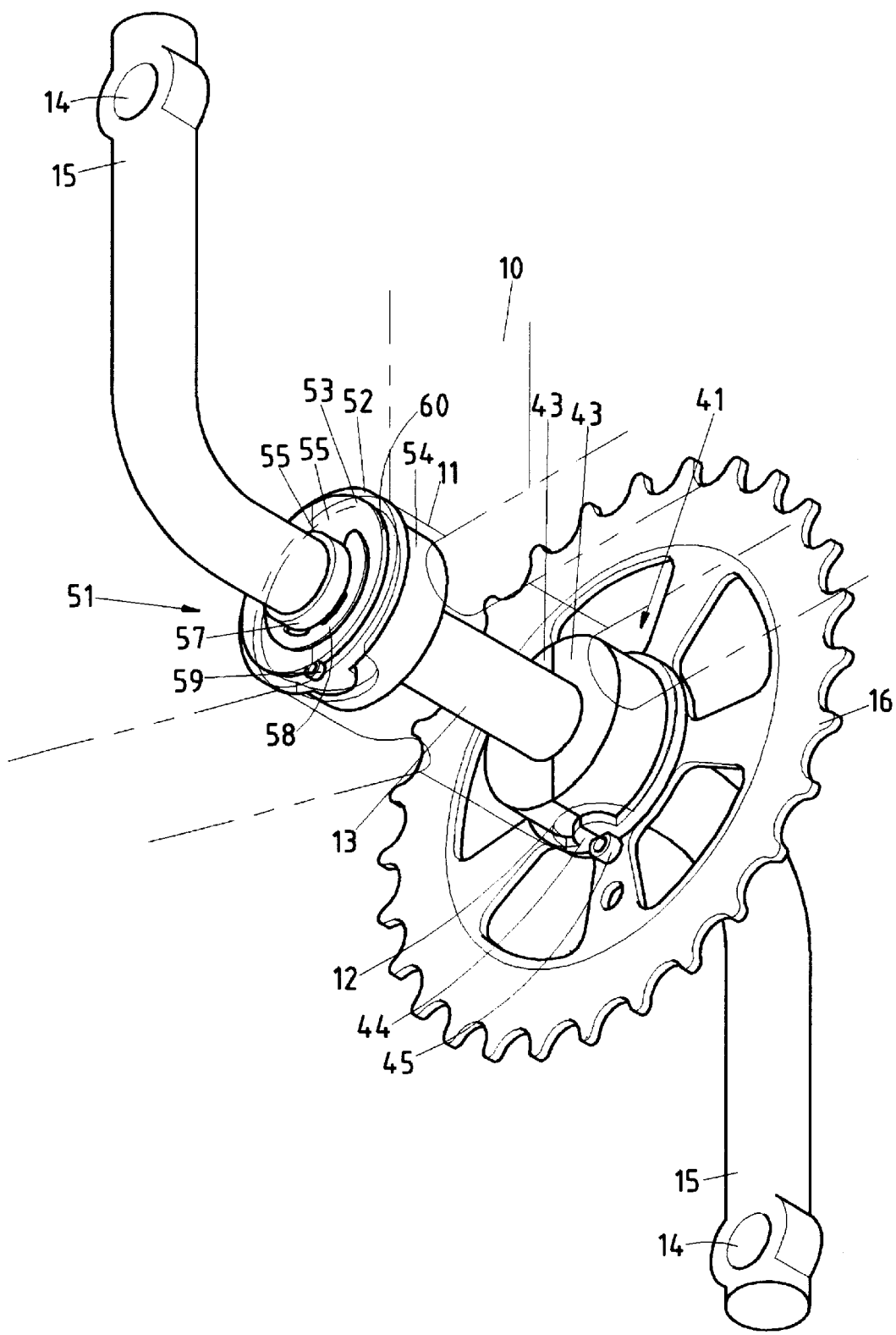
FIG. 6 shows a perspective view of the axle of the children's bicycle of the present invention.
Figure 7:
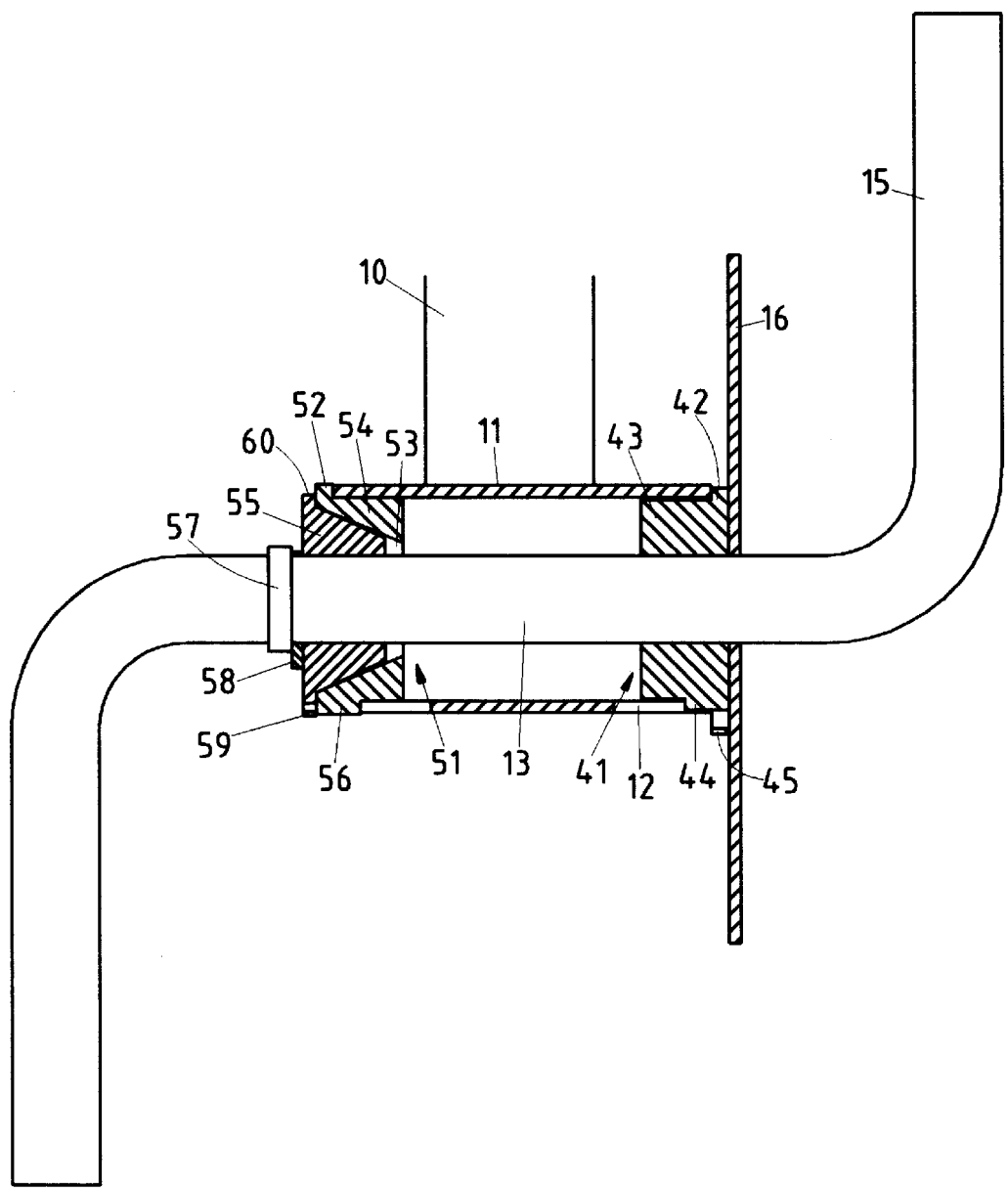
FIG. 7 shows a sectional view of the axle of the children's bicycle of the present invention.

As shown in FIGS. 5–6, a children's bicycle 10 of the present invention has a shaft tube 11 which is provided at both ends thereof with a position confining recess 12. An axle 13 is provided at both ends thereof with a crank arm 15 having a shaft support hole 14, and a chain ring 16 fastened therewith. The axle 13 is fastened pivotally to the shaft tube 11 by means of a first shaft support member 41 and a second shaft support member 51. The first shaft support member 41 is formed of two semicircular members 43, with each having an annular lip 42 and an insertion protrusion 44 corresponding in location to the position confining recess 12. The second shaft support member 51 is formed of a circular tubular member 54 having an annular lip 52 and a tapered cell 53, in conjunction with two semicircular plug members 55, with each having an annular protruded edge 60 which is received in the tapered cell 53. The circular tubular member 54 is provided with an insertion protrusion 56 corresponding in location to the position confining recess 12. The shaft tube 11 is provided with an annular stop edge 57 which is provided with a C-shaped retainer 58 for pressing against the outer side of the semicircular plug member 55.

The two semicircular members 43 of the first shaft support member 41 are connected by a pliable plate 45. The two semicircular plug members 55 of the second shaft support member 51 are connected by a pliable plate 59.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. An axle pivoting structure of a children's bicycle comprising a shaft tube which is provided at both ends thereof with a position confining recess, said axle being provided at both ends thereof with a crank arm having a shaft support hole, said axle further provided with a chain ring mounted thereon, said axle being fastened pivotally to said shaft tube by a first shaft support member and a second shaft support member; wherein said first shaft support member is formed of two semicircular members, with each having an annular lip and an insertion protrusion corresponding in location to said position confining recess of said shaft tube; wherein said second shaft support member is formed of a circular tubular member having an annular lip and a tapered cell, in conjunction with two semicircular plug members, with each having an annular protruded edge which is received in said tapered cell, said circular tubular member provided with an insertion protrusion corresponding in location to said position confining recess of said shaft tube whereby said shaft tube is provided with an annular stop edge which is provided with a C-shaped retainer for pressing against the outer side of said semicircular plug member.

2. The axle pivoting structure as defined in claim 1, wherein said two semicircular members of said first shaft support member are connected by a pliable plate.

3. The axle pivoting structure as defined in claim 1, wherein said two semicircular plug members of said second shaft support member are connected by a pliable plate.

* * * * *